(12) United States Patent
Cheng

(10) Patent No.: US 10,451,938 B2
(45) Date of Patent: Oct. 22, 2019

(54) FLEXIBLE TOUCH PANEL AND OLED DISPLAY PANEL

(71) Applicant: WUHAN CHINA STAR OPTOELECTRONICS TECHNOLOGY CO., LTD., Wuhan (CN)

(72) Inventor: Wei Cheng, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 15/752,904

(22) PCT Filed: Aug. 20, 2015

(86) PCT No.: PCT/CN2015/087618
§ 371 (c)(1),
(2) Date: Feb. 15, 2018

(87) PCT Pub. No.: WO2017/028297
PCT Pub. Date: Feb. 23, 2017

(65) Prior Publication Data
US 2018/0259817 A1    Sep. 13, 2018

(30) Foreign Application Priority Data

Aug. 17, 2015 (CN) .......................... 2015 1 0502460

(51) Int. Cl.
*G02F 1/1362* (2006.01)
*G02F 1/1337* (2006.01)
(Continued)

(52) U.S. Cl.
CPC ...... *G02F 1/136209* (2013.01); *G02F 1/1337* (2013.01); *G02F 1/1343* (2013.01); *G02F 1/133345* (2013.01); *G02F 1/133788* (2013.01); *G02F 1/13338* (2013.01); *G02F 2001/133607* (2013.01); *G02F 2201/086* (2013.01); *G02F 2201/50* (2013.01)

(58) Field of Classification Search
CPC ......... G02F 1/136209; G02F 1/133345; G02F 1/13338; G02F 1/1337; G02F 1/1343; G02F 1/133788; G02F 2001/133607; G02F 2201/086; G02F 2201/50
USPC .......................................................... 349/84
See application file for complete search history.

(56) References Cited

U.S. PATENT DOCUMENTS

| 6,577,356 B2* | 6/2003 | Onishi | G02F 1/13334 349/123 |
| 2010/0039596 A1* | 2/2010 | Shin | G02F 1/133711 349/124 |
| 2012/0249936 A1* | 10/2012 | Zi | H01L 27/1288 349/106 |

* cited by examiner

Primary Examiner — Nathanael R Briggs
Assistant Examiner — William D Peterson
(74) Attorney, Agent, or Firm — JMB Davis Ben-David

(57) ABSTRACT

A liquid crystal display panel is provided, and includes a color film substrate and an array substrate. The array substrate includes a device layer disposed on a glass substrate; and two ultraviolet protective layers disposed on the same side of the device layer. A first ultraviolet protective layer is close to the UV light source, and a second ultraviolet protective layer is far away from the UV light source. The refractive index of the first ultraviolet protective layer to UV light is greater than the refractive index of the second ultraviolet protective layer to UV light. One UV mask is reduced, to ensure that device characteristics remain unaffected.

18 Claims, 2 Drawing Sheets

(51) Int. Cl.
*G02F 1/1333* (2006.01)
*G02F 1/1343* (2006.01)
*G02F 1/1335* (2006.01)

FLEXIBLE TOUCH PANEL AND OLED DISPLAY PANEL

CROSS REFERENCE TO RELATED APPLICATIONS

This application is a U.S. National Phase application submitted under 35 U.S.C. § 371 of Patent Cooperation Treaty Application serial No. PCT/CN2015/087618, filed on Aug. 20, 2015, which claims the priority of China Patent Application serial No. 201510502460.9, filed on Aug. 17, 2015, the disclosures of which are incorporated herein by reference in their entirety.

FIELD OF INVENTION

The present invention relates to the field of display technologies, and more particularly to a liquid crystal display panel.

BACKGROUND OF INVENTION

TFT-LCD liquid crystal display screens are thin-film-transistor liquid-crystal display screens. Each pixel of thin-film transistor (TFT) is provided with a semiconductor switch, and each of the pixels is directly controlled by a point pulse. Liquid crystals are used as light valves to control light sources to form a display, and each pixel is provided with a semiconductor switch. In low temperature poly-crystalline silicon (LTPS) technology, the semiconductor device is made of low-temperature polycrystalline silicon which serve as a channel layer, and take on characteristic of switches by metal scanning lines and signal lines. In high resolution and narrow border conditions, opening frame rates in LTPS products are gradually reduced to about 20% or even less, and curing requirements of energy and illuminance to the corresponding frame sealant are also greatly increased so that the frame sealant can be solidified more sufficiently. High-energy and high-illumination ultraviolet (UV) break the bonding of liquid crystals which is inside the boxed panel, and affect image stilling performance of the liquid crystal screens. In addition, in existing LTPS alignment technology, traditional rubbing alignment methods has been gradually changed to an optical alignment technology. Compared with the traditional friction alignment methods, the light alignment technology mainly employs UV light with high energy and high illumination to irradiate sides of TFT-LCD array and sides of CF. After the alignment film is irradiated by UV, it forms an alignment force and provides an initial alignment capability to the liquid crystals to form pre-tilt angles. The high energy of UV waveband causes irreversible damages to the LTPS TFT semiconductor device. After the UV irradiation, the characteristics of the device drifts, which causes the semiconductor switching device to lose function, and leads to deviation of threshold voltage, and abnormal Ion/Ioff;

Therefore, it is necessary to provide a new technical solution to solve the above technical problems.

SUMMARY OF INVENTION

The present disclosure aims to provide a liquid crystal display panel which can improve the film forming conditions to obtain high-density silicon dioxide thin film without adding any process and cost. Using the characteristics of total reflection, the influence of UV irradiation is avoided. Thus, one UV mask can be reduced, and the characteristics of the device are ensured to be unaffected.

In order to solve the problem, the technical scheme of the disclosure is as follows:

A liquid crystal display panel, comprising: a color film substrate and an array substrate disposed opposite to the color film substrate;

wherein the array substrate comprises:

a glass substrate;

a plurality of light shielding sheets disposed between a device layer and the glass substrate, wherein each of the light shielding sheets is aligned with and completely covers thin film transistor;

the device layer disposed on the glass substrate, wherein the thin film transistors are disposed in the device layer;

an alignment film layer configured to align liquid crystal molecules in a particular direction, wherein the alignment film layer is disposed on a surface of the array substrate adjacent to the color film substrate; and an insulating layer disposed between the alignment film layer and the device layer, wherein at least a part of the insulating layer is adjacent to the alignment film layer, and a refractive index of the alignment film layer to UV light is greater than a refractive index of the insulation layer to UV light; and wherein a first ultraviolet protective layer and a second ultraviolet protective layer are further disposed between the device layer and the glass substrate; and wherein the first ultraviolet protective layer is close to a UV light source, and the second ultraviolet protective layer is far away from the UV light source; and a refractive index of the first ultraviolet protective layer to UV light is greater than a refractive index of the second ultraviolet protective layer to UV light.

The disclosure further provides a liquid crystal display panel, comprising: a color film substrate and an array substrate disposed opposite to the color film substrate;

wherein the array substrate comprises:

a glass substrate; and a device layer disposed on the glass substrate, wherein thin film transistors are disposed in the device layer;

wherein two ultraviolet protective layers are disposed on the same side of the device layer, the first ultraviolet protective layer is close to a UV light source, and the second ultraviolet protective layer is far away from the UV light source; and a refractive index of the first ultraviolet protective layer to UV light is greater than a refractive index of the second ultraviolet protective layer to UV light.

Preferably, in the liquid crystal display panel, the array substrate further comprises an alignment film layer configured to align liquid crystal molecules in a particular direction, wherein the alignment film layer is disposed on a surface of the array substrate adjacent to the color film substrate;

wherein when the alignment film layer is subjected to a light alignment treatment, the first ultraviolet protective layer and the second ultraviolet protective layer are disposed between the device layer and the alignment film layer.

Preferably, in the liquid crystal display panel, the array substrate further comprises an alignment film layer configured to align liquid crystal molecules in a particular direction, wherein the alignment film layer is disposed on a surface of the array substrate adjacent to the color film substrate;

wherein when the alignment film layer is subjected to a light alignment treatment, the first ultraviolet protective layer is the alignment film layer, and the second ultraviolet protective layer is disposed between the device layer and the alignment film layer.

Preferably, in the liquid crystal display panel, the array substrate further comprises:

an insulating layer disposed between the alignment film layer and the device layer, and wherein at least a part of the insulating layer is adjacent to the alignment film layer; and a pixel electrode layer disposed between the alignment film layer and the insulating layer;

wherein the second ultraviolet protective layer is the insulating layer.

Preferably, in the liquid crystal display panel, the liquid crystal display panel further comprises a frame sealant configured to align and fix the array substrate and the color film substrate;

wherein when the frame sealant is subjected to a photo-curing treatment, the UV light source is incident from a side of the glass substrate of the array substrate, and the first ultraviolet protective layer and the second ultraviolet protective layer are disposed between the device layer and the glass substrate.

Preferably, in the liquid crystal display panel, the array substrate further comprises a buffer layer, wherein the buffer layer is disposed between the glass substrate and the device layer;

wherein the buffer layer is a multi-layer structure which comprises the first ultraviolet protective layer and the second ultraviolet protective layer.

Preferably, in the liquid crystal display panel, the buffer layer comprises a first silicon nitride layer, a silicon oxide layer and a second silicon nitride layer; wherein one of the first silicon nitride layer and the second silicon nitride layer, which is close to the glass substrate, is the first ultraviolet protective layer; and the other thereof, which is far away from the glass substrate, is the second ultraviolet protective layer.

Preferably, in the liquid crystal display panel, a plurality of light shielding sheets are disposed between the device layer and the glass substrate, wherein each of the light shielding sheets is aligned with and completely covers one the thin film transistor.

Preferably, in the liquid crystal display panel, the array substrate further comprises:

an alignment film layer configured to align liquid crystal molecules in a particular direction, wherein the alignment film layer is disposed on a surface of the array substrate adjacent to the color film substrate; and an insulating layer disposed between the alignment film layer and the device layer, wherein at least a part of the insulating layer is adjacent to the alignment film layer, a refractive index of the alignment film layer to UV light is greater than a refractive index of the insulation layer to UV light;

wherein the first ultraviolet protective layer and the second ultraviolet protective layer are further disposed between the device layer and the glass substrate.

Preferably, in the liquid crystal display panel, the array substrate further comprises:

a buffer layer disposed between the glass substrate and the device layer;

wherein the buffer layer is a multi-layer structure which comprises the first ultraviolet protective layer and the second ultraviolet protective layer.

Compared with the prior art, the present disclosure provide that two ultraviolet protective layers are disposed on the same side of the device layer, the first ultraviolet protective layer, which is close to a UV light source, is an optically denser medium; the second ultraviolet protective layer, which is far away from the UV light source, is an optically rarer medium; a refractive index of the first ultraviolet protective layer to UV light is greater than a refractive index of the second ultraviolet protective layer to UV light. When the UV light source is irradiated from the first ultraviolet protective layer to the second ultraviolet protective layer, a total reflection occurs at the position to protect the device layer. Therefore, the present disclosure improves the film forming conditions to obtain high-density silicon dioxide thin film without adding any process and cost. Using the characteristics of total reflection, the influence of UV irradiation is avoided. Thus, one UV mask can be reduced, and the characteristics of the device are ensured to be unaffected.

For a better understanding of the aforementioned content of the present invention, preferable embodiments are illustrated in accordance with the attached figures for detailed explanation.

DETAILED DESCRIPTION OF PREFERRED EMBODIMENTS

The word "embodiment" as used in this specification is intended to mean serving as an instance, example, or illustration. Furthermore, the articles "a", used in this specification and the appended claims, is generally construed as intended to mean "one or more", unless otherwise specified or clear from lead to singular form.

The display panel in the present disclosure can be a thin film transistor liquid crystal display (TFT-LCD), an active matrix organic light emitting diode (AMOLED) panel, and other display panels.

In the embodiment of the present disclosure, two ultraviolet protective layers are disposed on the same side of the device layer. The first ultraviolet protective layer, which is close to a UV light source, is an optically denser medium. The second ultraviolet protective layer, which is far away from the UV light source, is an optically rarer medium. A refractive index of the first ultraviolet protective layer to UV light is greater than a refractive index of the second ultraviolet protective layer to UV light. When the UV light source is irradiated from the first ultraviolet protective layer to the second ultraviolet protective layer, a total reflection occurs at the position to protect the device layer. Therefore, the present disclosure improves film forming conditions to obtain high-density silicon dioxide thin film without adding any process and cost. Using the characteristics of total reflection, influence of UV irradiation is avoided. Thus, one UV mask can be reduced, and the characteristics of the device are ensured to be unaffected.

The disclosure further provides a liquid crystal display panel. The liquid crystal display comprises a color film substrate and an array substrate disposed opposite to the color film substrate; wherein the array substrate comprises: a glass substrate; and a device layer disposed on the glass substrate, wherein thin film transistors are disposed in the device layer. Two ultraviolet protective layers are disposed on the same side of the device layer. The first ultraviolet protective layer is close to a UV light source, and the second ultraviolet protective layer is far away from the UV light source. A refractive index of the first ultraviolet protective layer to UV light is greater than a refractive index of the second ultraviolet protective layer to UV light.

In order to illustrate the technical scheme described by the present disclosure, the following particular embodiments are used for describing the technical scheme.

Embodiment 1

Figure 1:
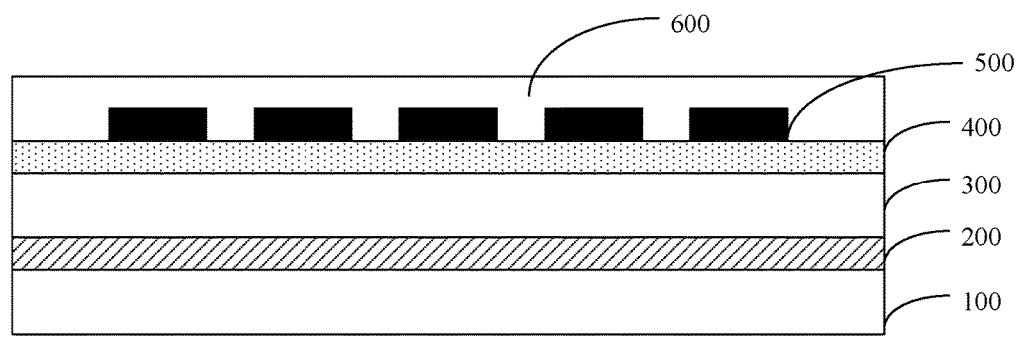
FIG. 1 is a schematic structural diagram of a liquid crystal display panel according to the first embodiment of the present disclosure.

Please refer to FIG. 1, which is a schematic structural diagram of a liquid crystal display panel according to the first embodiment of the present disclosure. For convenience of explanation, only the parts which is related to the embodiments of the present invention is shown. The liquid crystal display panel comprises a color film substrate and an array substrate disposed opposite to the color film substrate.

The array substrate comprises: a glass substrate 100, a device layer 200, a planarization layer 300, an insulating layer 400, a pixel electrode layer 500, and an alignment film layer 600. The device layer 200 is disposed on the glass substrate 100. The planarization layer 300 is disposed on the device layer 200. The insulating layer 400 is disposed on the planarization layer 300, and at least a part of the insulating layer is adjacent to the alignment film layer. The pixel electrode layer 500 is disposed on the insulation layer 400. The alignment film layer 600 is disposed on the pixel electrode layer 500. The alignment film layer 600 is configured to align liquid crystal molecules in a particular direction. The alignment film layer 600 is disposed on a surface of the array substrate adjacent to the color film substrate.

However, it is appreciated that the planarization layer 300 is optional. The device layer can be planarized if the planarization layer 300 is provided.

As an embodiment of the present invention, when the alignment film layer is subjected to a light alignment treatment, a first ultraviolet protective layer and a second ultraviolet protective layer are disposed between the device layer and the alignment film layer. However, it is appreciated that when the alignment film layer is subjected to a light alignment treatment, the first ultraviolet protective layer can be the alignment film layer, and the second ultraviolet protective layer is disposed between the device layer and the alignment film layer.

In particular, the insulating layer 400 is silicon nitride, and the alignment film layer 600 is made of a traditional alignment film material. The film forming conditions of the insulating layer 400 and the alignment film layer 600 are adjusted respectively during manufacturing, so that a refractive index of the alignment film layer 600 is visibly greater than a refractive index of the insulation layer 400. The alignment film layer 600 with a relatively greater refractive index serves as the first ultraviolet protective layer, and the insulating layer 400 with a less refractive index serves as the second ultraviolet protective layer. In the light alignment process of the embodiment, the UV light source is positioned at one side of the array substrate adjacent to the alignment film layer 600. the UV light source is incident from the optically denser alignment film layer 600 to the optically rarer insulating layer 400. When the light is refracted from the optically denser medium to the optically rarer medium, the refraction angle is always greater than the incidence angle, and the incidence angle corresponding to the 90 degrees refraction angle is called a critical angle; when the incidence angle is greater than the critical angle, the light rays cannot enter the other side of the demarcation surface (i.e., the side where the optically rarer medium is positioned) and results in total reflection.

Similarly, the incident direction of the UV light is adjusted. Using alignment film layer 600 serving as an optically denser medium in the embodiment and an insulation layer 400 serving as an optically rarer medium, so that the UV light is totally reflected at the interface of the alignment film layer 600 and the insulation layer 400. Therefore, the UV light is prevented from continuously penetrating into the array substrate to protect the device layer 200.

In the embodiment, the alignment film layer 600 and the insulating layer 400, which are disposed on the same side of the device layer in the array substrate, are directly used as the first ultraviolet protective layer and the second ultraviolet protective layer. The value of the refractive index is adjusted by changing the film forming conditions, so that the alignment film layer 600 becomes an optically denser medium with greater refractive index, and the insulating layer 400 is an optically rarer medium with a refractive index less than the refractive index of the alignment film layer 600. Therefore, the first ultraviolet protective layer and the second ultraviolet protective layer of the embodiment can provide a better protection and sustainably increase the yield for the TFT device layer in the optical alignment process, while the number of layers and the manufacturing processes of the array substrate in the prior art is not increased.

Figure 2:
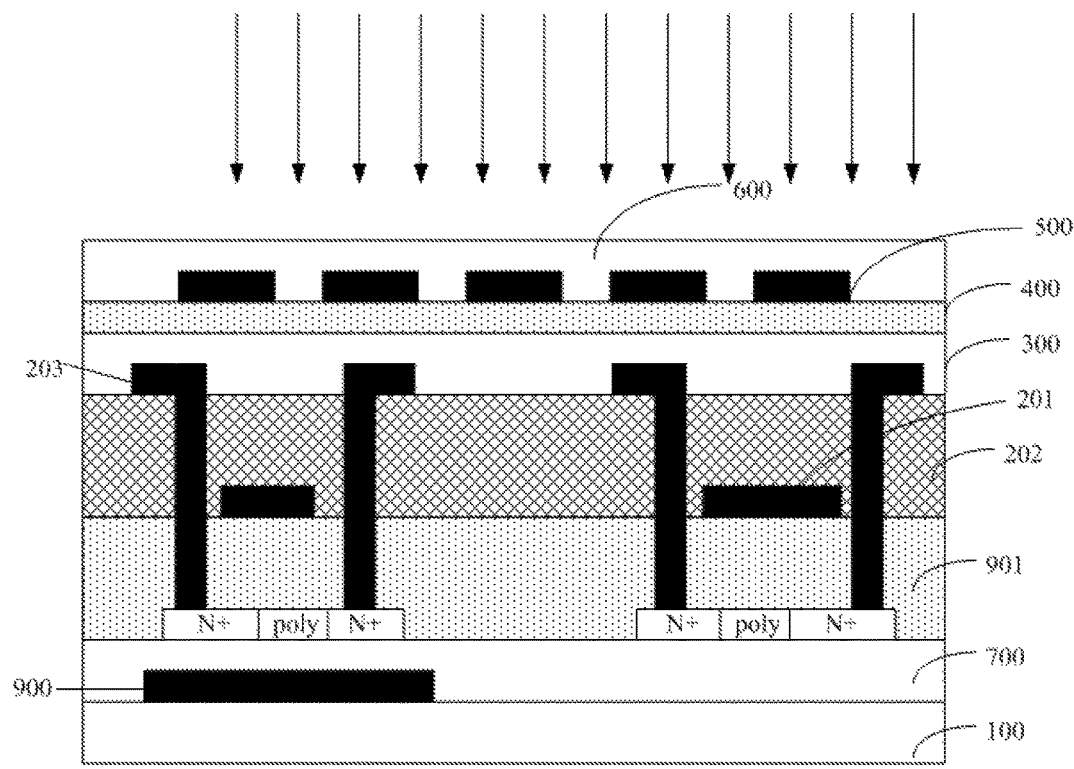
FIG. 2 is a schematic structural diagram of a device layer according to an embodiment of the present disclosure.

Please refer to FIG. 2, which is a schematic structural diagram of a device layer according to an embodiment of the present disclosure. For convenience of explanation, only the parts which is related to the embodiments of the present invention is shown.

The device layer 200 comprises: a gate electrode 201, an isolation layer 202, a source electrode and a drain electrode 203, a gate insulating layer 901, and a channel layer (the layer marked with "N+"). The source electrode and the drain electrode 203 penetrate through the through holes on the isolation layer 202 to connect with two ends of the channel layer, respectively. The isolation layer 202 is made of silicon nitride and other materials which are electrically insulated, so that the gate electrode 201 is electrically insulated from the source drain electrode 203. The grid electrode 201 connects with the scanning line. The source electrode or the drain electrode 203 connects with the data line.

Embodiment 2

Figure 3:
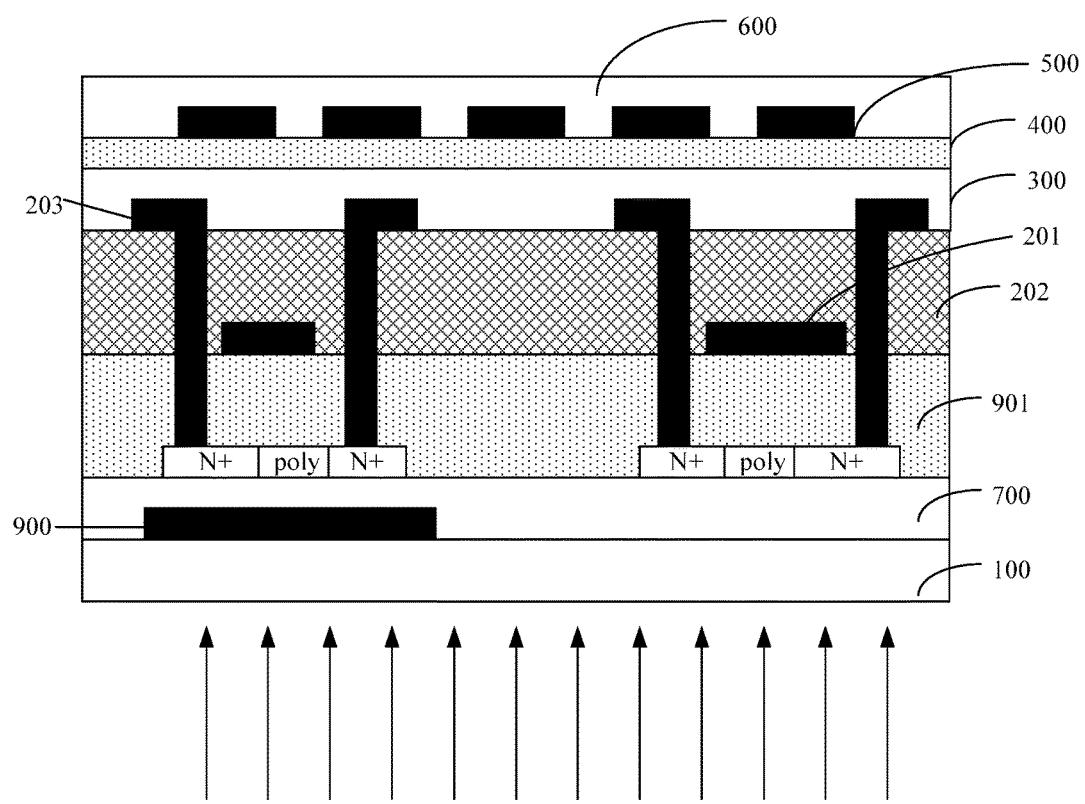
FIG. 3 is a schematic structural diagram of a liquid crystal display panel according to the second embodiment of the present disclosure.

Please refer to FIG. 3, which is a schematic structural diagram of a liquid crystal display panel according to the second embodiment of the present invention. For convenience of explanation, only the parts which is related to the embodiments of the present invention is shown. The liquid crystal display panel comprises a color film substrate, an array substrate disposed opposite to the color film substrate, and a frame sealant configured to align and fix the array substrate and the color film substrate.

The array substrate comprises a glass substrate 100, a buffer layer 700, and a device layer 200. The buffer layer 700 is positioned between the glass substrate 100 and the device layer 200. Thin film transistors are disposed in the device layer 200.

In the embodiment of the present disclosure, the buffer layer 700 is a multi-layer structure which comprises the first ultraviolet protective layer and the second ultraviolet protective layer. The first ultraviolet protective layer is close to a UV light source, and the second ultraviolet protective layer is far away from the UV light source. A refractive index of the first ultraviolet protective layer to UV light is greater than a refractive index of the second ultraviolet protective layer to UV light.

Figure 4:
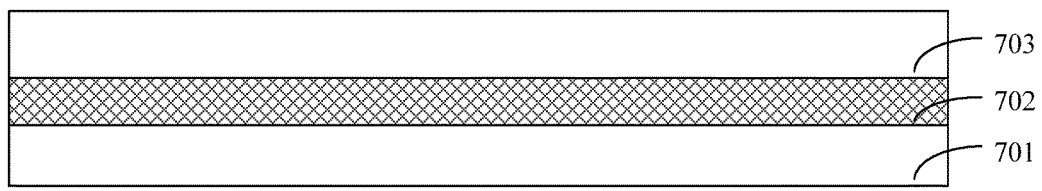
FIG. 4 is a schematic structural diagram of a buffer layer according to an embodiment of the present disclosure.

Referring to FIG. 4, in an embodiment of the present invention, the buffer layer includes a first silicon nitride layer 701, a silicon oxide layer 702, and a second silicon nitride layer 703. One of the first silicon nitride layer and the second silicon nitride layer, which is close to the glass substrate, is the first ultraviolet protective layer; and the other thereof, which is far away from the glass substrate, is the second ultraviolet protective layer.

In the embodiment of the invention, the film forming conditions of the first silicon nitride layer 701 and the silicon oxide layer 702 are adjusted respectively, so that the refractive index of the first silicon nitride layer 701 is visibly greater than the refractive index of the silicon oxide layer 702. The first silicon nitride layer 701 with relatively greater refractive index serve as a first ultraviolet protective layer, and the silicon oxide layer 702 with a smaller refractive index serve as a second ultraviolet protective layer.

As a preferred embodiment of the present disclosure, a plurality of light shielding sheets 900 are further disposed between the device layer and the glass substrate, each of the light blocking sheet is aligned with and completely covers one the thin film transistor. The light shielding sheet 900 is disposed on the glass substrate 100 to prevent the influence of light to the device layer 200.

In the embodiment of the present disclosure, when the frame sealant is subjected to photo-curing treatment, the UV light source is incident from a side of the glass substrate of the array substrate. The light shielding sheet can block direct UV light so that it prevents the UV light from entering the device layer, and the influence of light on the device layer 200 is avoided. However, there is still an oblique UV light. Therefore, the embodiment of the present disclosure is provided with a buffer layer, which comprises the first ultraviolet protective layer and the second ultraviolet protective layer, so that the oblique UV light is totally reflected at the interface of the first ultraviolet protective layer and the second ultraviolet protective layer to prevent the UV light from continuously penetrating into the array substrate and thus protect the device layer 200.

Embodiment 3

Please refer to FIGS. 2 and 3, which are a schematic structural diagram of a liquid crystal display panel according to the third embodiment of the present disclosure. For convenience of explanation, only the parts which is related to the embodiments of the present invention is shown. The liquid crystal display panel comprises: a color film substrate, an array substrate disposed opposite to the color film substrate, and a frame sealant configured to align and fix the array substrate and the color film substrate.

The array substrate comprises a glass substrate 100, a light shielding sheet 900, a buffer layer 700, a device layer 200, a planarization layer 300, an insulating layer 400, and a pixel electrode layer 500, and an alignment film layer 600.

The light shielding sheet 900 is disposed on the glass substrate 100 for preventing the influence of light on the device layer 200. The buffer layer 700 is disposed on the light shielding sheet 900. The device layer 200 is disposed on the buffer layer 700. The planarization layer 300 is disposed on the device layer 200. The insulating layer 400 is disposed on the planarization layer 300, and at least a part of the insulating layer is adjacent to the alignment film layer. The pixel electrode layer 500 is disposed on the insulating layer 400 The alignment film layer 600 is disposed on the pixel electrode layer 500. The alignment film layer 600 configured to align liquid crystal molecules in a particular direction. The alignment film layer 600 is disposed on a surface of the array substrate adjacent to the color film substrate.

In the light alignment process of the embodiment, the UV light source is positioned at one side of the array substrate adjacent to the alignment film layer 600. the UV light source is incident from the optically denser alignment film layer 600 to the optically rarer insulating layer 400. When the light is refracted from the optically denser medium to the optically rarer medium, the refraction angle is always greater than the incidence angle, and the incidence angle corresponding to the 90 degrees refraction angle is called a critical angle. When the incidence angle is greater than the critical angle, the light rays cannot enter the other side of the demarcation surface (i.e., the side where the optically rarer medium is positioned) and results in total reflection.

Similarly, the incident direction of the UV light is adjusted. Using alignment film layer 600 serving as an optically denser medium in the embodiment and an insulation layer 400 serving as an optically rarer medium, so that the UV light is totally reflected at the interface of the alignment film layer 600 and the insulation layer 400. Therefore, the UV light is prevented from continuously penetrating into the array substrate to protect the device layer 200.

In the embodiments of the present disclosure, the array substrate and the color film substrate are aligned and attached to form a liquid crystal panel box via a frame sealant, and a UV light source is adopted to irradiate the liquid crystal panel box to ensure the frame sealant to be solidified, so that the array substrate and the color film substrate are reliably connected with a good sealing performance.

when the frame sealant is subjected to photo-curing treatment, the UV light source is incident from a side of the glass substrate of the array substrate. The light shielding sheet can block direct UV light so that it prevents the UV light from entering the device layer, and the influence of light on the device layer 200 is avoided. However, there is still an oblique UV light. Therefore, the embodiment of the present disclosure is provided with a buffer layer, the buffer layer comprises the first ultraviolet protective layer and the second ultraviolet protective layer, so that the oblique UV light is totally reflected at the interface of the first ultraviolet protective layer and the second ultraviolet protective layer to prevent the UV light from continuously penetrating into the array substrate and thus protect the device layer 200.

In conclusion, two ultraviolet protective layers are disposed on the same side of the device layer, the first ultraviolet protective layer, which is close to a UV light source, is an optically denser medium; the second ultraviolet protective layer, which is far away from the UV light source, is an optically rarer medium; a refractive index of the first ultraviolet protective layer to UV light is greater than a refractive index of the second ultraviolet protective layer to UV light. When the UV light source is irradiated from the first ultraviolet protective layer to the second ultraviolet protective layer, a total reflection occurs at the position to protect the device layer. Therefore, the present disclosure improves the film forming conditions to obtain high-density silicon dioxide thin film without adding any process and cost. Using the characteristics of total reflection, the influence of UV irradiation is avoided. Thus, one UV mask can be reduced, and the characteristics of the device are ensured to be unaffected.

Although the disclosure has been shown and described with respect to one or more implementations, equivalent alterations and modifications will occur to others skilled in the art based at least in part upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "has", "with", or variants thereof are used in either the detailed description or the claims, such terms are intended to be inclusive in a manner similar to the term "comprising."

In summary, although the present invention has been described with preferred embodiments thereof, the above preferred embodiments is not used to limit the present invention. One of ordinarily skill in the art can carry out changes and modifications to the described embodiment without departing from the scope and the spirit of the invention that is intended to be limited only by the appended claims.

What is claimed is:

1. A liquid crystal display panel, comprising:
   a color film substrate and an array substrate disposed opposite to the color film substrate;
   wherein the array substrate comprises:
   a glass substrate;
   a plurality of light shielding sheets disposed between a device layer and the glass substrate, wherein each of the light shielding sheets is aligned with and completely covers one thin film transistor;
   the device layer disposed on the glass substrate, wherein the thin film transistors are disposed in the device layer;
   an alignment film layer configured to align liquid crystal molecules in a particular direction, wherein the alignment film layer is disposed on a surface of the array substrate adjacent to the color film substrate; and
   an insulating layer disposed between the alignment film layer and the device layer, wherein at least a part of the insulating layer is adjacent to the alignment film layer, and a refractive index of the alignment film layer to UV light is greater than a refractive index of the insulation layer to UV light; and
   wherein a first ultraviolet protective layer and a second ultraviolet protective layer are further disposed between the device layer and the glass substrate; and
   wherein the first ultraviolet protective layer is next to a UV light source, and the second ultraviolet protective layer is away from the UV light source; and a refractive index of the first ultraviolet protective layer to UV light is greater than a refractive index of the second ultraviolet protective layer to UV light.

2. The liquid crystal display panel according to claim 1, wherein when the alignment film layer is subjected to a light alignment treatment, the first ultraviolet protective layer and the second ultraviolet protective layer are disposed between the device layer and the alignment film layer.

3. The liquid crystal display panel according to claim 1, wherein when the alignment film layer is subjected to a light alignment treatment, the first ultraviolet protective layer is the alignment film layer, and the second ultraviolet protective layer is disposed between the device layer and the alignment film layer.

4. The liquid crystal display panel according to claim 3, wherein the second ultraviolet protective layer is the insulating layer.

5. The liquid crystal display panel according to claim 1, wherein the liquid crystal display panel further comprises a frame sealant configured to align and fix the array substrate and the color film substrate;
   wherein when the frame sealant is subjected to a photo-curing treatment, the UV light source is incident from a side of the glass substrate of the array substrate, and the first ultraviolet protective layer and the second ultraviolet protective layer are disposed between the device layer and the glass substrate.

6. The liquid crystal display panel according to claim 5, wherein the array substrate further comprises a buffer layer, wherein the buffer layer is disposed between the glass substrate and the device layer;
   wherein the buffer layer is a multi-layer structure which comprises the first ultraviolet protective layer and the second ultraviolet protective layer.

7. The liquid crystal display panel according to claim 6, wherein the buffer layer comprises a first silicon nitride layer, a silicon oxide layer, and a second silicon nitride layer; wherein one of the first silicon nitride layer and the second silicon nitride layer, which is close to the glass substrate, is the first ultraviolet protective layer; and the other thereof, which is far away from the glass substrate, is the second ultraviolet protective layer.

8. The liquid crystal display panel according to claim 1, wherein the array substrate further comprises:
   a buffer layer disposed between the glass substrate and the device layer;
   wherein the buffer layer is a multi-layer structure which comprises the first ultraviolet protective layer and the second ultraviolet protective layer.

9. A liquid crystal display panel, comprising: a color film substrate and an array substrate disposed opposite to the color film substrate;
   wherein the array substrate comprises:
   a glass substrate; and
   a device layer disposed on the glass substrate, wherein thin film transistors are disposed in the device layer;
   wherein two ultraviolet protective layers are disposed on the same side of the device layer, the first ultraviolet protective layer is close to a UV light source, and the second ultraviolet protective layer is far away from the UV light source; and a refractive index of the first ultraviolet protective layer to UV light is greater than a refractive index of the second ultraviolet protective layer to UV light.

10. The liquid crystal display panel according to claim 9, wherein the array substrate further comprises an alignment film layer configured to align liquid crystal molecules in a particular direction, wherein the alignment film layer is disposed on a surface of the array substrate adjacent to the color film substrate;
  wherein when the alignment film layer is subjected to a light alignment treatment, the first ultraviolet protective layer and the second ultraviolet protective layer are disposed between the device layer and the alignment film layer.

11. The liquid crystal display panel according to claim 9, wherein the array substrate further comprises an alignment film layer configured to align liquid crystal molecules in a particular direction, wherein the alignment film layer is disposed on a surface of the array substrate adjacent to the color film substrate;
  wherein when the alignment film layer is subjected to a light alignment treatment, the first ultraviolet protective layer is the alignment film layer, and the second ultraviolet protective layer is disposed between the device layer and the alignment film layer.

12. The liquid crystal display panel according to claim 11, wherein the array substrate further comprises:
  an insulating layer disposed between the alignment film layer and the device layer, and wherein at least a part of the insulating layer is adjacent to the alignment film layer; and
  a pixel electrode layer disposed between the alignment film layer and the insulating layer;
  wherein the second ultraviolet protective layer is the insulating layer.

13. The liquid crystal display panel according to claim 9, wherein the liquid crystal display panel further comprises a frame sealant configured to align and fix the array substrate and the color film substrate;
  wherein when the frame sealant is subjected to a photo-curing treatment, the UV light source is incident from a side of the glass substrate of the array substrate, and the first ultraviolet protective layer and the second ultraviolet protective layer are disposed between the device layer and the glass substrate.

14. The liquid crystal display panel according to claim 13, wherein the array substrate further comprises a buffer layer, wherein the buffer layer is disposed between the glass substrate and the device layer;
  wherein the buffer layer is a multi-layer structure which comprises the first ultraviolet protective layer and the second ultraviolet protective layer.

15. The liquid crystal display panel according to claim 14, wherein the buffer layer comprises a first silicon nitride layer, a silicon oxide layer and a second silicon nitride layer; wherein one of the first silicon nitride layer and the second silicon nitride layer, which is close to the glass substrate, is the first ultraviolet protective layer; and the other thereof, which is far away from the glass substrate, is the second ultraviolet protective layer.

16. The liquid crystal display panel according to claim 9, wherein a plurality of light shielding sheets are disposed between the device layer and the glass substrate, wherein each of the light shielding sheets is aligned with and completely covers one the thin film transistor.

17. The liquid crystal display panel according to claim 9, wherein the array substrate further comprises:
  an alignment film layer configured to align liquid crystal molecules in a particular direction, wherein the alignment film layer is disposed on a surface of the array substrate adjacent to the color film substrate; and
  an insulating layer disposed between the alignment film layer and the device layer, wherein at least a part of the insulating layer is adjacent to the alignment film layer, a refractive index of the alignment film layer to UV light is greater than a refractive index of the insulation layer to UV light;
  wherein the first ultraviolet protective layer and the second ultraviolet protective layer are further disposed between the device layer and the glass substrate.

18. The liquid crystal display panel according to claim 17, wherein the array substrate further comprises:
  a buffer layer disposed between the glass substrate and the device layer;
  wherein the buffer layer is a multi-layer structure which comprises the first ultraviolet protective layer and the second ultraviolet protective layer.

* * * * *